April 25, 1939.  M. PFAUTER  2,155,680

ROTARY TABLE FOR MACHINE TOOLS

Filed May 4, 1938

INVENTOR.
M. PFAUTER
BY
ATTYS.

Patented Apr. 25, 1939

2,155,680

UNITED STATES PATENT OFFICE 2,155,680

ROTARY TABLE FOR MACHINE TOOLS

Michael Pfauter, Chemnitz, Germany

Application May 4, 1938, Serial No. 206,049
In Germany December 24, 1935

6 Claims. (Cl. 90—58)

This invention relates to rotary work-supporting tables for machine tools such as vertical turning and boring machines and grinding machines.

According to the invention such a rotary table is provided with a device for relieving the load on it by the action of fluid under pressure and with a device for centering it which is separate and distinct from this load-relieving device. Apart from comparative simplicity in manufacture and the fact that each device can be designed solely with a view to the single function it has to perform, such an arrangement has advantages as compared with attempting to provide such a table with one device which acts both to relieve the load and centre the table. Thus it is of advantage in obtaining accurate running of the table as well as uniformity of rotation of the table, the requirements regarding which are of a high order in machine tools especially in machines for cutting gear wheels. It is also given freedom in making the load-relieving device of such a diameter or size that the pressure per unit area that has to be exerted on it to relieve the load to the desired extent and thus the pressure of the fluid can be made relatively low, as a result of which packing the load-relieving device is rendered easier and a simpler kind of pump can be employed.

The invention will now be described with reference to the accompanying drawing which illustrates by way of example two different ways of carrying it into effect as applied to a roller milling machine. In the drawing.

Similar reference numerals indicate similar parts in the several views.

Figure 1:
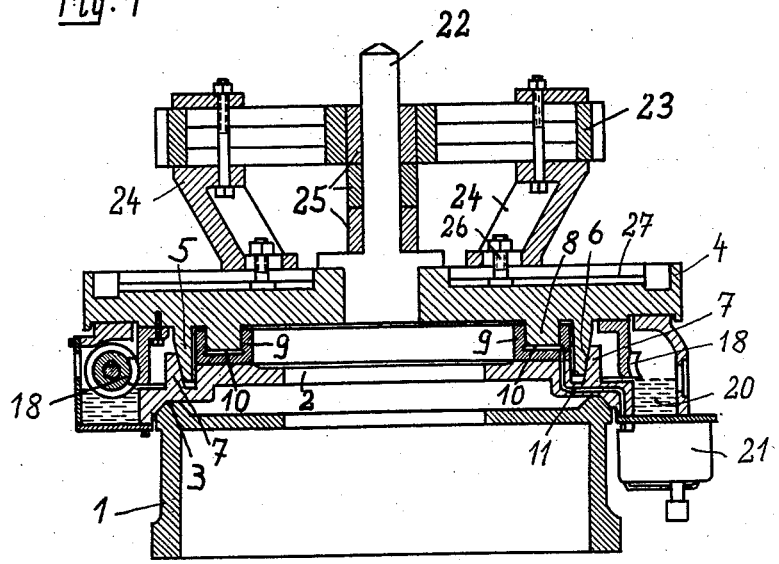
Figure 1 is a cross-section taken through the axis of the rotary table.
Figure 2:
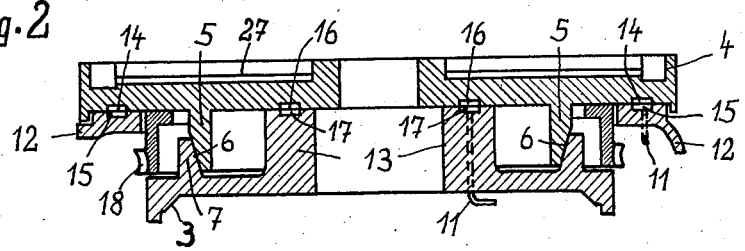
Figure 2 is a cross-section through a modified form of table.
Figure 3:
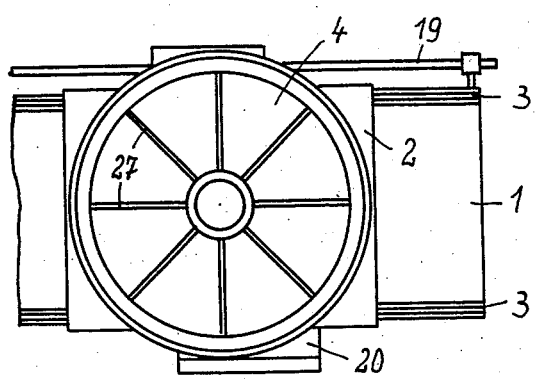
Figure 3 is a plan corresponding to Figure 1 but on a smaller scale and with the work and the clamping device omitted.

Referring to the drawing, 2 is a slide or support which is longitudinally displaceable on guideways 3 mounted on a bed 1. The horizontal rotary table 4, which is of circular form, is rotatably mounted on the slide 2. The work is clamped on it in a vertical or perpendicular direction. A downward annular projection 5 on the table 4 serves for centering it and is provided with a conical surface 6 which co-operates with a corresponding conical surface on an upward annular projection 7 on the slide 2. In the form of Figure 1 the rotary table 4 has a further downward annular projection 8 which projects down into and runs in a U-shaped ring 9 which is laterally-displaceable on the slide 2. There is a space 10 between the bottom surface of the extension 8 and the inside bottom surface of the ring 9 and the fluid under pressure, which is preferably oil, is forced into this space from a pump, conveniently in the form of a gear wheel pump, through a pipe 11, so that a liquid cushion which serves to relieve the table 4 of its load is formed there. In the arrangement of Figure 2 the liquid cushions are provided in the spaces formed between annular recesses 14 and 16 near the edge and toward the center of the table 4 and co-operating annular recesses in supports 12 and 13 for the table which are provided on the slide 2.

The load relieving device may have a large effective surface in order to obtain a low pressure for the fluid for relieving the table. For this purpose the load relieving device may have a large diameter or it may comprise two or more surfaces, against which the pressure-fluid acts to relieve the load.

The pressure of the fluid is adjusted to correspond to the load. The point or points at which the load is relieved support the whole load and give at the same time an effective lubrication of the table.

The table 4 is rotated from the main drive by the worm drive 18 by way of the shaft 19. 20 is an oil container from which the pump takes the oil employed for relieving the load on the table. 21 is the casing containing the pump and an oil pressure indicator. The mandrel 22 serves for centering the work 23 on the rotary table. The work 23 is firmly mounted and centered on the table by supports 24 and the rings 25. The supports 24 are fixed on the table by screws 26 in fixing slots 27.

The invention can be employed to all kinds of machine-tools having a horizontal rotary work supporting table with a vertical axis such as lathes with horizontal faceplates, grinding machines, drilling machines, and boring machines.

Having now particularly described and ascertained the nature of my said invention in what manner the same is to be performed, I declare that what I claim is:

1. A rotary table for a machine tool comprising a support, a centering device on the table and support, and a device for relieving the load of the table on the support by the action of fluid under pressure, said devices being separate from one another.

2. A rotary table for a machine tool comprising a support therefor, a centering device between the support and table, and a device for relieving the load by the action of fluid under pressure, said devices being separate from one another, the load relieving device having a large effective surface for the pressure-fluid substantially concentric with the centering device.

3. A rotary table for a machine tool comprising a support upon which said table is mounted and an annular guide-way between the support and table, and centering device substantially concentric with the guide-way, and means for admitting fluid under pressure to said guide-way thereby to relieve the load while said table is rotating.

4. A device of the character set forth in claim 2, including means for rotating the table with respect to the support.

5. A device of the character set forth in claim 3, including a pump for forcing fluid under pressure to said guide-way and means for rotating the table with respect to the support, said last mentioned means including a worm and gear adapted to turn in the fluid used for relieving the load of the table on the support.

6. A device of the character set forth in claim 2, in which the centering mechanism, the rotating mechanism and the pressure relieving mechanism are all separate from each other.

MICHAEL PFAUTER.